United States Patent
Ogawa et al.

(10) Patent No.: US 11,545,721 B2
(45) Date of Patent: Jan. 3, 2023

(54) SECONDARY BATTERIES (71) Applicant: Panasonic Intellectual Property Management Co., Ltd., Osaka (JP)

(72) Inventors: Yuko Ogawa, Osaka (JP); Hideharu Takezawa, Nara (JP); Yuki Tokuda, Osaka (JP); Hiroyuki Okuda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 248 days.

(21) Appl. No.: 16/771,053

(22) PCT Filed: Oct. 26, 2018

(86) PCT No.: PCT/JP2018/039808
§ 371 (c)(1),
(2) Date: Jun. 9, 2020

(87) PCT Pub. No.: WO2019/123835
PCT Pub. Date: Jun. 27, 2019

(65) Prior Publication Data
US 2020/0303708 A1 Sep. 24, 2020

(30) Foreign Application Priority Data
Dec. 22, 2017 (JP) .............................. JP2017-246047

(51) Int. Cl.
*H01M 50/449* (2021.01)
*H01M 50/46* (2021.01)
(Continued)

(52) U.S. Cl.
CPC ......... *H01M 50/449* (2021.01); *H01M 4/133* (2013.01); *H01M 4/134* (2013.01);
(Continued)

(58) Field of Classification Search
CPC ...... H01M 50/46; H01M 50/449; H01M 4/38; H01M 4/134
See application file for complete search history.

(56) References Cited

U.S. PATENT DOCUMENTS

2005/0214637 A1 9/2005 Imachi et al.
2016/0276643 A1* 9/2016 Iwase .................. H01M 10/058

FOREIGN PATENT DOCUMENTS

JP 2005-100955 A 4/2005
JP 2005-285385 A 10/2005
(Continued)

OTHER PUBLICATIONS

International Search Report dated Dec. 25, 2018, issued in counterpart Application No. PCT/JP2018/039808 (2 pages).

*Primary Examiner* — Kenneth J Douyette
(74) *Attorney, Agent, or Firm* — WHDA, LLP (57) ABSTRACT

A secondary battery includes an electrode assembly including a positive electrode, a negative electrode, a first separator disposed on one side of the surface of the negative electrode and having a thickness T1, and a second separator disposed on the other side of the surface of the negative electrode and having a thickness T2. The thickness T2 of the second separator is larger than the thickness T1 of the first separator. The first separator includes a first porous film having a porosity P1, and the second separator includes a second porous film having a porosity P2. At least one of the first separator and the second separator includes a heat resistant layer. The positive electrode, the first separator, the negative electrode and the second separator are wound together such that the first separator is arranged on the outer side and the second separator is arranged on the inner side.

9 Claims, 4 Drawing Sheets (51) Int. Cl.
    *H01M 4/133*     (2010.01)
    *H01M 4/134*     (2010.01)
    *H01M 4/38*     (2006.01)
    *H01M 4/48*     (2010.01)
    *H01M 4/583*     (2010.01)
    *H01M 4/62*     (2006.01)
    *H01M 10/04*     (2006.01)
    *H01M 10/0525*     (2010.01)
    *H01M 10/0587*     (2010.01)

(52) U.S. Cl.
    CPC .............. *H01M 4/386* (2013.01); *H01M 4/48* (2013.01); *H01M 4/583* (2013.01); *H01M 4/621* (2013.01); *H01M 10/0422* (2013.01); *H01M 10/0431* (2013.01); *H01M 10/0525* (2013.01); *H01M 10/0587* (2013.01); *H01M 50/46* (2021.01)

(56) References Cited

FOREIGN PATENT DOCUMENTS

| | | | |
|---|---|---|---|
| JP | 2011-113921 A | 6/2011 | |
| JP | 2013-218913 A | 10/2013 | |

\* cited by examiner

Figure 12

SECONDARY BATTERIES

TECHNICAL FIELD

The present invention relates to a secondary battery including a wound electrode assembly.

BACKGROUND ART

In recent years, electronic devices are rapidly changing to portable and cordless formats. Compact consumer secondary batteries having a high energy density are used as power supplies for the driving of these devices. Further, large secondary batteries are developed as electrical power storage systems and power supplies for driving electric vehicles. Secondary batteries require characteristics such as high output characteristics, durability and safety.

Incidentally, a secondary battery including a wound electrode assembly tends to have a gradient of the concentration of an electrolytic solution within the electrode assembly. A wound electrode assembly is composed of a positive electrode, a negative electrode and a separator which are wound together. The electrodes have a higher curvature in the inside (the center of the coil) than in the outside, and consequently the porosity tends to be more reduced. If an electrolytic solution has a concentration gradient, ions migrate at nonuniform speeds to cause a decrease in output and to adversely affect cycle characteristics.

Patent Literature 1 proposes a lithium ion battery which includes a first separator disposed on the inner side of a positive electrode plate that is coiled, and a second separator disposed on the inner side of a negative electrode plate that is coiled, and satisfies V2>V1 and T2≥T1, or satisfies V2=V1 and T2>T1 wherein V1 and T1 are the void content and the thickness, respectively, of the first separator, and V2 and T2 are the void content and the thickness, respectively, of the second separator. This battery is designed so that the separator on the inner side of the negative electrode plate which tends to be compressed to a smaller porosity will hold more electrolytic solution.

CITATION LIST

Patent Literature

PTL 1: Japanese Published Unexamined Patent Application No. 2005-100955

SUMMARY OF INVENTION

After repeated cycles of charging and discharging of a secondary battery, a separator is gradually collapsed and degraded to lower its ability to retain a solution. The proposal of Patent Literature 1 is insufficient and does not offer further improvements in cycle characteristics.

An aspect of the present invention pertains to a secondary battery which includes an electrode assembly including a positive electrode, a negative electrode, a first separator disposed on one side of surface of the negative electrode and having a thickness T1, and a second separator disposed on the other side of surface of the negative electrode and having a thickness T2, wherein the thickness T2 of the second separator is larger than the thickness T1 of the first separator, the first separator includes a first porous film having a porosity P1, the second separator includes a second porous film having a porosity P2, at least one of the first separator and the second separator includes a heat resistant layer, and the positive electrode, the first separator, the negative electrode and the second separator are wound together in such a manner that the first separator is arranged on the outer side and the second separator is arranged on the inner side.

The secondary battery provided according to the present invention can attain excellent cycle characteristics.

DESCRIPTION OF EMBODIMENTS

A secondary battery according to an embodiment of the present invention includes a wound electrode assembly. The electrode assembly includes a positive electrode, a negative electrode, a first separator disposed on one side of the surface of the negative electrode and having a thickness T1, and a second separator disposed on the other side of the surface of the negative electrode and having a thickness T2. Here, the thickness T2 of the second separator is larger than the thickness T1 of the first separator, i.e., satisfies T1<T2. The first separator includes a first porous film having a porosity P1. The second separator includes a second porous film having a porosity P2. At least one of the first separator and the second separator includes a heat resistant layer (hereinafter, also written as the HRL). The positive electrode, the first separator, the negative electrode and the second separator are wound together in such a manner that the first separator is arranged on the outer side and the second separator is arranged on the inner side.

As a result of the satisfaction of T1<T2, the gradient of the concentration of an electrolytic solution within the electrode assembly is lowered. In an electrode assembly of a secondary battery, the affinity between a negative electrode and an electrolytic solution is generally lower than the affinity between a positive electrode and an electrolytic solution. Thus, from the point of view of enhancing cycle characteristics, it is effective to supply a negative electrode with a sufficient amount of an electrolytic solution. That is, it is effective to allow the second separator disposed inside of the negative electrode to retain more electrolytic solution than the first separator disposed inside of the positive electrode.

Next, at least one of the first separator and the second separator includes an HRL. This configuration ensures that the separator is resistant to collapse during repeated cycles of charging and discharging of the secondary battery over a long period, and the separator maintains its solution retention ability over a long term. Thus, the cycle characteristics of the secondary battery are enhanced.

When, in particular, the second separator disposed inside of the negative electrode has an HRL, the degradation of the second separator is markedly suppressed. Thus, the gradient of the concentration of an electrolytic solution within the electrode assembly is effectively lowered over a long period. The solution retention ability of the electrode assembly as a whole is enhanced also when an HRL is present only in the first separator disposed outside of the negative electrode.

To suppress the degradation of the second separator more markedly, it is preferable that when the first separator and the second separator each include an HRL, the thickness x2 of the HRL in the second separator be larger than the thickness x1 of the HRL in the first separator. In particular, it is preferable that $1.1 \leq x2/x1 \leq 3$ be satisfied.

In a preferred embodiment, the product P2T2 of the porosity P2 of the second porous film multiplied by the thickness T2 of the second separator is larger than the product P1T1 of the porosity P1 of the first porous film multiplied by the thickness T1 of the first separator. In this case, the gradient of the concentration of an electrolytic solution within the electrode assembly is lowered more markedly.

The porosities of the first and the second porous films are each generally controlled to 50 to 60%. Specifically, these porosities are controlled within a relatively small range of about 10%, and thus the control of P1 and P2 alone offers a limited effect in managing the gradient of the concentration of an electrolytic solution within the electrode assembly. In contrast, the gradient of the concentration of an electrolytic solution can be effectively managed when the thicknesses of the separators are controlled and further the separator(s) is provided with an HRL.

The HRL may be arranged in opposed relation with the negative electrode or in opposed relation with the positive electrode. From the point of view of suppressing the oxidative degradation of the separator, it is preferable that the HRL be opposed to the positive electrode. Further, the HRL contains a resistance component and therefore is more preferably arranged in opposed relation with the positive electrode from the point of view of allowing the negative electrode reaction to take place more quickly.

For example, the HRL includes an inorganic filler and a resin binder. Inorganic fillers are high in hardness and excellent in durability, and thus offer marked enhancements in the durability of the separators as a whole, allowing the solution retention ability to be maintained over a longer term.

The HRL may include a heat resistant resin. Heat resistant resins generally have a strong molecular structure and are excellent in durability. Thus, the durability of the separators as a whole is markedly enhanced, and the solution retention ability is maintained over a longer term.

The negative electrode may include a carbon material and a silicon material as negative electrode active materials. Carbon materials and silicon materials are generally low in wettability with electrolytic solutions. However, the structure described hereinabove makes up for the low wettability and facilitates the electrode reaction occurring on the negative electrode.

Further, a silicon material exhibits large expansion and shrinkage during charging and discharging, and thus the flow of an electrolytic solution into and out of the negative electrode is correspondingly intense. As a result, a negative electrode containing a silicon material generally tends to be deficient in electrolytic solution inside thereof. However, the structure described hereinabove allows an electrolytic solution to be supplied sufficiently and quickly into the negative electrode, and facilitates the electrode reaction occurring on the negative electrode.

Hereinbelow, nonaqueous electrolyte secondary batteries as an example of the secondary batteries will be described in further detail.

The first separator (outside) and the second separator (inside) each have a thickness that is necessary for the separator to retain a sufficient amount of an electrolytic solution. T1 and T2 may be, for example, 10 to 30 μm, and preferably 8 to 20 μm. If T1 and T2 are equal, the amount in which an electrolytic solution is held differs between the outside and the inside of the negative electrode. As a result, a difference is produced in ion migration speed, and will make the electrode reaction nonuniform and will cause a decrease in cycle characteristics. When T1<T2, in contrast, the difference in the amount in which an electrolytic solution is held is reduced. To obtain such effects sufficiently, it is preferable that $1.1 \leq T2/T1 \leq 2$ be satisfied, and it is more preferable that $1.2 \leq T2/T1 \leq 1.6$ be satisfied.

When the first separator and the second separator each include an HRL, the thicknesses T1 and T2 of the respective separators are the thicknesses of the whole including the HRL. The thickness of the HRL alone may be, for example, 1 to 8 μm, and preferably 3 to 6 μm. Further, the thickness of the HRL may represent, for example, 5 to 50% of the thickness T1 or T2 of the separator.

Next, the first porous film and the second porous film each have a porosity that is necessary for the separator to retain a sufficient amount of an electrolytic solution. For example, P1 and P2 may be each 40 to 60%, more generally 50 to 60%, and preferably 50 to 55%.

As described hereinabove, it is preferable that P1T1<P2T2 be satisfied. To attain more marked enhancements in cycle characteristics, it is more preferable that $1.1 \leq P2T2/P1T1 \leq 2.5$ be satisfied, and it is still more preferable that $1.4 \leq P2T2/P1T1 \leq 1.7$ be satisfied.

The first porous film and the second porous film may be each, for example, a polyolefin porous film. The polyolefin porous films may be porous films based on a polyolefin. The polyolefin porous films may have a function (a so-called shutdown function) which, in the event of a battery abnormality, blocks the pores at the maximum temperature up to which safety can be ensured.

Examples of the polyolefins which form the polyolefin porous films include polyethylene, polypropylene and ethylene-propylene copolymer. These resins may be used singly, or two or more may be used in combination.

The porous films may be formed by any methods without limitation. For example, a processing aid, a lubricant and the like may be added to a polyolefin, the mixture being then melt kneaded to homogeneity, and the kneaded product may be extruded in an extruder to give a resin sheet. The resin sheet may be stretched at a temperature (in the range of about 135° C. to about 150° C.) higher than the melting point of the polyolefin to give a nonporous film. Next, the nonporous film may be further stretched so as to cleave boundaries of polyolefin crystals, thus producing pores. This stretching treatment may be performed with a pair of nip roll units having different speeds.

For example, the heat resistant layer (HRL) includes a heat resistant resin having a melting point higher than the melting point of the polyolefin. In this case, the HRL not only enhances the durability of the separator as a whole, but also has a function to prevent a short circuit due to the meltdown of the separator in the event where the battery temperature is increased more than expected. Further, the HRL also has a function to reduce the shrinkage factor of the separator at the time of shutdown of the porous film, thus making a great contribution to enhancing the safety of the battery.

The shutdown temperature of porous films is generally in the range of, for example, 120 to 150° C. Thus, the heat resistant resin which constitutes the HRL preferably has a heat distortion temperature higher than this temperature.

The heat distortion temperature may be measured as the deflection temperature under load. The deflection temperature under load is determined under a load of 1.82 MPa by a method in accordance with ASTM-D648, American Society for Testing and Materials.

The heat distortion temperature of the heat resistant resin is preferably not less than 260° C. In this case, sufficiently high thermal stability is exhibited even in the event of overheating of the battery (usually about 180° C.).

Specific examples of the heat resistant resins include polyacrylates, aromatic polyamides (for example, wholly aromatic polyamides) such as aramids; polyimide resins such as polyimides, polyamideimides, polyetherimides and polyesterimides; aromatic polyesters such as polyethylene terephthalates; polyphenylene sulfides; polyether nitriles; polyether ether ketones; and polybenzimidazoles. The heat resistant resins may be used singly, or two or more may be used in combination. In particular, aramids, polyimides, polyamideimides, etc. are preferable because these resins are excellent in heat resistance and in the ability to retain an electrolytic solution.

To attain further enhancements in strength and heat resistance, the HRL may include an inorganic filler. Examples of the inorganic fillers include, for example, metal oxides or ceramics such as silica, alumina, titania and zeolite; mineral fillers such as talc and mica; carbides such as silicon carbide; nitrides such as silicon nitride; and glasses. The shapes of the inorganic fillers are not particularly limited, and may be powders, fibers, flakes, masses or the like. The inorganic fillers may be used singly, or two or more may be used in combination.

The content of the inorganic filler contained in the HRL is, for example, 50 to 400 parts by mass, and preferably 30 to 300 parts by mass with respect to 100 parts by mass of the heat resistant resin. The more the inorganic filler, the higher the hardness or strength of the HRL.

The HRL may be composed of the inorganic filler described above, and a resin binder. The resin binder may be, for example, a material which is used as a binder for holding an active material to a current collector in a positive electrode or a negative electrode. Specifically, fluororesins, rubber particles, acrylic resins and the like may be used as the resin binders. In this case, the HRL adheres to the porous film by the tackiness of the resin binder.

The HRL may be stacked onto the porous film by any method without limitation. For example, a method may be adopted in which the porous film is coated with a solution or dispersion of the heat resistant resin or a raw material thereof, or a film of HRL is produced separately and laminated together with the porous film. Where necessary, the solution or dispersion of the heat resistant resin or a raw material thereof may include an inorganic filler or may include a pore-forming agent such as calcium chloride. The solution or dispersion applied to the surface of the porous film may be dried as required.

When polyimide or polyamideimide is used as the heat resistant resin, for example, a bilayer separator may be produced in the following manner. First, a cast film of a polyamide acid solution is stretched to form a film of HRL precursor. A porous film is placed onto the surface of the precursor obtained, and the films are joined into an integral unit by being heated at a temperature which does not cause shutdown of the porous film. This integrity may be achieved by the use of, for example, hot rolls. The heat from the hot rolls promotes the imidization of the polyamide acid to convert the polyamide acid in the precursor into polyimide or polyamideimide.

The separator may contain a conventional additive (such as an antioxidant). For example, the oxidation resistance of the porous film may be enhanced by adding an antioxidant in a skin layer on the porous film. The antioxidant may be at least one selected from the group consisting of phenolic antioxidants, phosphoric acid antioxidants and sulfur antioxidants.

Next, the secondary batteries will be described with reference to the drawings.

Figure 1:
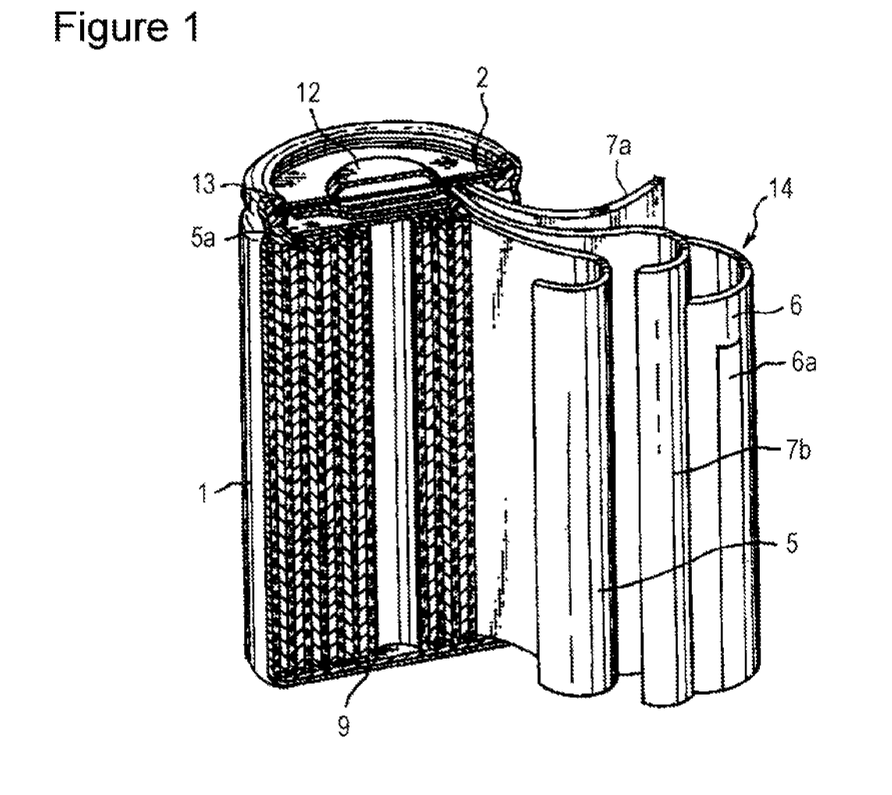
FIG. 1 is a cutout and partly developed view of an example of secondary batteries according to the present invention.

FIG. 1 is a partly cutout perspective view of a cylindrical lithium ion secondary battery according to an embodiment of the present invention. The lithium ion secondary battery of FIG. 1 includes an electrode assembly 14 in which a strip of a positive electrode 5 and a strip of a negative electrode 6 are wound together via a first separator 7a and a second separator 7b. The first separator 7a is arranged outside of the negative electrode 6, and the second separator 7b is arranged inside of the negative electrode 6. The electrode assembly 14 is accommodated in a bottomed cylindrical metallic battery case 1 together with a nonaqueous electrolyte (not shown).

Figure 2:
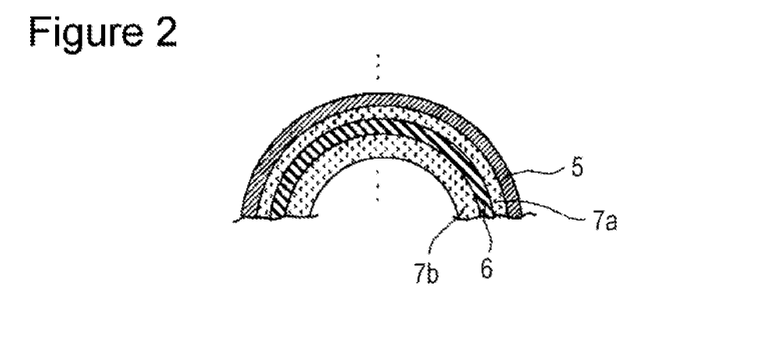
FIG. 2 is a schematic view illustrating a transverse sectional structure of an electrode assembly included in a secondary battery according to the present invention.

FIG. 2 is a schematic view illustrating part of a transverse section (a cross section perpendicular to the winding axis) of the electrode assembly 14. The thickness T2 of the second separator 7b disposed inside of the negative electrode 6 is larger than the thickness T1 of the first separator 7a disposed outside of the negative electrode 6.

Figure 3:
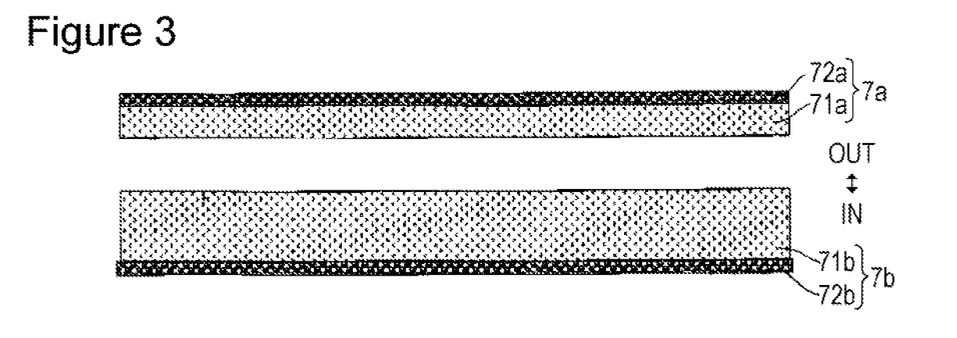
FIG. 3 is a sectional view of examples of a first separator and a second separator according to the present invention.
Figure 4:
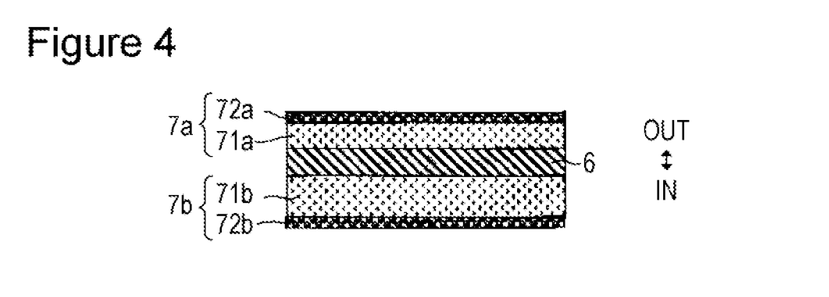
FIG. 4 is a sectional schematic view illustrating an arrangement of a negative electrode, a first separator and a second separator in EXAMPLE 1 of the present invention.
Figure 5:
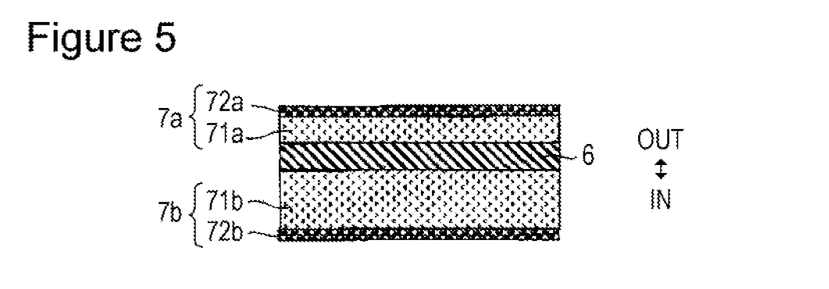
FIG. 5 is a sectional schematic view illustrating an arrangement of a negative electrode, a first separator and a second separator in EXAMPLE 2 of the present invention.
Figure 6:
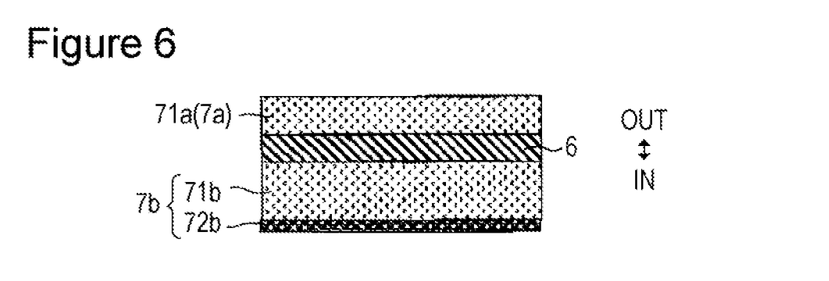
FIG. 6 is a sectional schematic view illustrating an arrangement of a negative electrode, a first separator and a second separator in EXAMPLE 3 of the present invention.
Figure 7:
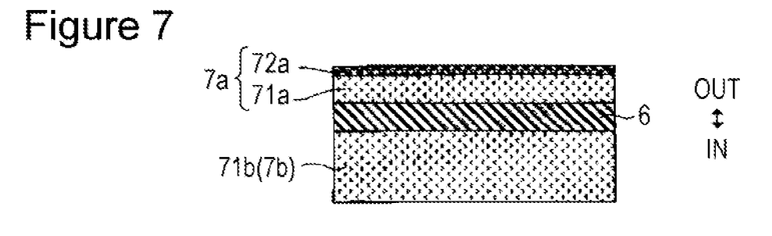
FIG. 7 is a sectional schematic view illustrating an arrangement of a negative electrode, a first separator and a second separator in EXAMPLE 4 of the present invention.
Figure 8:
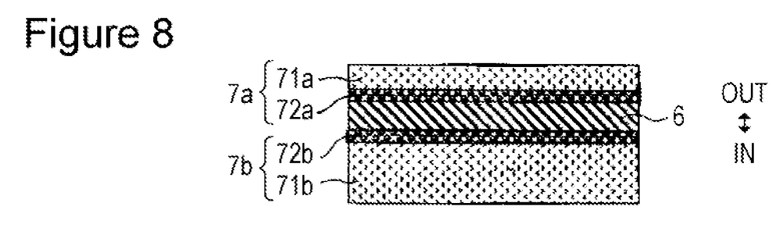
FIG. 8 is a sectional schematic view illustrating an arrangement of a negative electrode, a first separator and a second separator in EXAMPLE 5 of the present invention.
Figure 9:
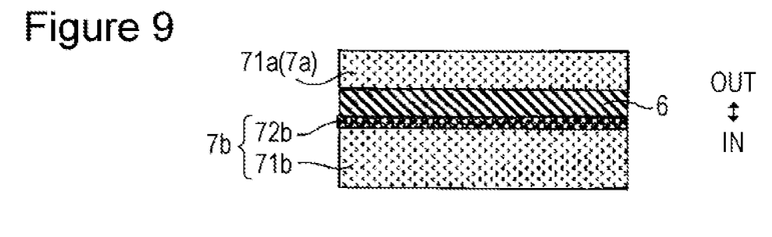
FIG. 9 is a sectional schematic view illustrating an arrangement of a negative electrode, a first separator and a second separator in EXAMPLE 6 of the present invention.
Figure 10:
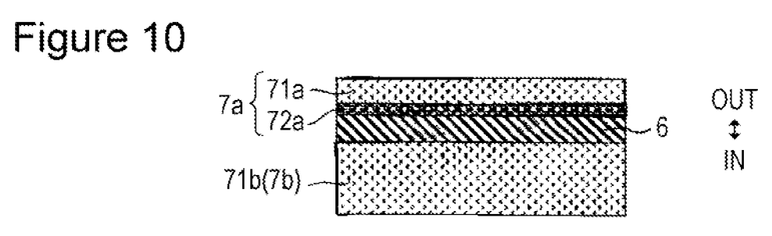
FIG. 10 is a sectional schematic view illustrating an arrangement of a negative electrode, a first separator and a second separator in EXAMPLE 7 of the present invention.
Figure 11:
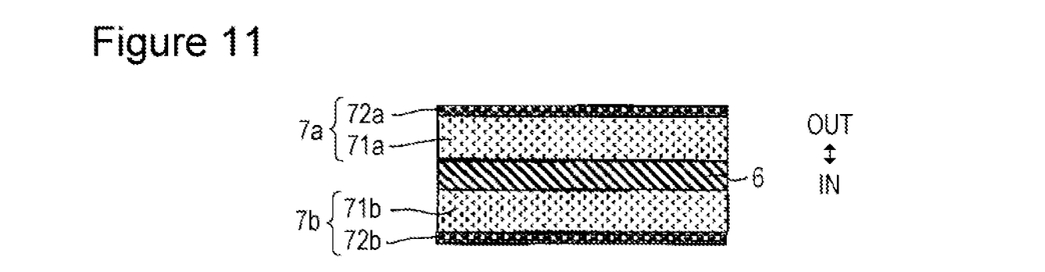
FIG. 11 is a sectional schematic view illustrating an arrangement of a negative electrode, a first separator and a second separator in COMPARATIVE EXAMPLE 1.
Figure 12:
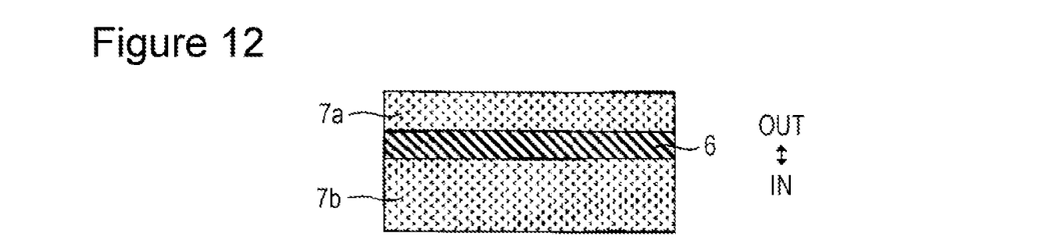
FIG. 12 is a sectional schematic view illustrating an arrangement of a negative electrode, a first separator and a second separator in COMPARATIVE EXAMPLE 2.

FIG. 3 shows sectional structures of the separators. In the illustrated example, the first separator 7a and the second separator 7b have a first porous film 71a and a second porous film 71b, respectively, and have an HRL 72a and an HRL 72b, respectively.

A positive electrode lead 5a is electrically connected to the positive electrode 5. A negative electrode lead 6a is electrically connected to the negative electrode 6. The electrode assembly 14 is accommodated in the battery case 1 together with a lower insulating plate 9 while the positive electrode lead 5a leads out from the assembly. The end portion of the positive electrode lead 5a is welded to a sealing plate 2. The sealing plate 2 includes a positive electrode external terminal 12 and a safety mechanism.

The lower insulating plate 9 is disposed between the bottom surface of the electrode assembly 14 and the negative electrode lead 6a leading out from the electrode assembly 14 in the downward direction. The end portion of the negative electrode lead 6a is welded to the inner bottom surface of the battery case 1. An upper insulating ring (not shown) is placed on the top surface of the electrode assembly 14. A portion of the battery case 1 above the level of the upper insulating ring defines an annular overhang along the lateral side thereof, and the electrode assembly 14 is fixed within the battery case 1 by the overhang. Next, a predetermined amount of a nonaqueous electrolyte is poured into the battery case 1. The positive electrode lead 5a is folded and housed into the battery case 1. The sealing plate 2 that is fitted with a gasket 13 along its periphery is placed on the overhang. Next, the open end portion of the battery case 1 is crimped inwardly. A sealed cylindrical lithium ion secondary battery is thus obtained.

The electrode assembly 14 is fabricated by arranging the positive electrode 5, the first separator 7a, the negative electrode 6 and the second separator 7b on top of one another in this order, winding them around a core (not shown) into a coil, and removing the core. Specifically, the positive electrode 5, the first separator 7a, the negative electrode 6 and the second separator 7b are arranged on top of one another while ensuring that end portions of the two separators 7a and 7b are beyond the longitudinal ends of the positive electrode 5 and the negative electrode 6, then the projecting end portions of the separators 7a and 7b are held with a pair of cores, and the whole is wound to form an electrode assembly 14.

Next, the constituent elements other than the separators of the lithium ion secondary batteries will be described.

Positive Electrodes

For example, the positive electrode is composed of a sheet of a positive electrode current collector, and a positive electrode active material layer disposed on the surface of the positive electrode current collector. Examples of the positive electrode current collectors which may be used include, for example, foils made of metals such as aluminum, aluminum alloys, stainless steel, titanium and titanium alloys. For example, the thickness of the positive electrode current collector is 1 to 100 μm, and preferably 10 to 50 μm. For example, the thickness of the positive electrode is 70 to 250 μm, and preferably 100 to 210 μm.

In addition to the positive electrode active material, the positive electrode active material layer may contain optional components such as a conductive agent, a binder and a thickener. The positive electrode active material may be, or example, a lithium transition metal compound which accepts lithium ions as a guest. Examples thereof include, for example, composite metal oxides of lithium and at least one metal selected from cobalt, manganese, nickel, chromium, iron and vanadium. More specific examples include $LiCoO_2$, $LiMn_2O_4$, $LiNiO_2$, $LiCo_xNi_{1-x}O_2$ ($0<x<1$), $LiCo_yM_{1-y}O_2$ ($0.6 \leq y<1$), $LiNi_zM_{1-z}O_2$ ($0.6 \leq z<1$), $LiCrO_2$, $\alpha LiFeO_2$ and $LiVO_2$. In these compositional formulae, M is at least one element selected from the group of Na, Mg, Sc, Y, Mn, Fe, Co, Ni, Cu, Zn, Al, Cr, Pb, Sb and B.

The positive electrode active material layer may be formed by kneading a positive electrode active material with a dispersion medium optionally together with a binder, a conductive agent and/or a thickener to prepare a mixture in the form of a slurry dispersion, and applying the mixture to a positive electrode current collector. The mixture, after its application, is dried and is pressed as required to form a positive electrode active material layer.

Negative Electrodes

For example, the negative electrode is composed of a sheet of a negative electrode current collector, and a negative electrode active material layer disposed on the surface of the negative electrode current collector. Examples of the negative electrode current collectors which may be used include, for example, foils made of metals such as copper, copper alloys, nickel, nickel alloys, stainless steel, aluminum and aluminum alloys. For example, the thickness of the negative electrode current collector is 1 to 100 μm, and preferably 2 to 50 μm. For example, the thickness of the negative electrode is 100 to 250 μm, and preferably 110 to 210 μm.

In addition to the negative electrode active material, the negative electrode active material layer may contain components such as a conductive agent, a binder and a thickener. Examples of the negative electrode active materials which may be used include carbon materials and silicon materials. Examples of the carbon materials include natural graphites, artificial graphites, non-graphitizable carbons (hard carbons) and graphitizable carbons (soft carbons). Examples of the silicon materials include silicon oxides ($SiO_\alpha$ ($0.05<\alpha<1.95$)) and silicon alloys.

Examples of the binders used in the positive electrode and/or the negative electrode include, for example, fluororesins, rubbers, acrylic polymers and vinyl polymers. Examples of the fluororesins include, for example, polyvinylidene fluorides, vinylidene fluoride-hexafluoropropylene copolymers and polytetrafluoroethylenes. Examples of the rubbers include acrylic rubbers, modified acrylonitrile rubbers and styrene-butadiene rubbers (SBR).

Examples of the conductive agents used in the positive electrode and/or the negative electrode include carbon blacks such as acetylene blacks, Ketjen blacks, channel blacks, furnace blacks, lamp blacks and thermal blacks; graphites such as natural graphites and artificial graphites; and conductive fibers such as carbon fibers and metal fibers.

A thickener may be used as required. Examples of the thickeners include ethylene-vinyl alcohol copolymers and cellulose derivatives (such as carboxymethylcellulose and methylcellulose).

Examples of the dispersion media which may be used include organic solvents and water. Examples of the organic solvents include N-methyl-2-pyrrolidone; ethers such as tetrahydrofuran; ketones such as acetone, methyl ethyl ketone and cyclohexanone; amides such as N,N-dimethylformamide and dimethylacetamide; sulfoxides such as dimethyl sulfoxide; and tetramethylurea.

Nonaqueous Electrolytes

The nonaqueous electrolyte is prepared by dissolving a lithium salt into a nonaqueous solvent. Examples of the nonaqueous solvents include, for example, cyclic carbonates such as ethylene carbonate, propylene carbonate and butylene carbonate; chain carbonates such as dimethyl carbonate and diethyl carbonate; lactones such as γ-butyrolactone; halogenated alkanes such as 1,2-dichloroethane; alkoxyalkanes such as 1,2-dimethoxyethane and 1,3-dimethoxypropane; ketones such as 4-methyl-2-pentanone; ethers such as 1,4-dioxane, tetrahydrofuran and 2-methyltetrahydrofuran; nitriles such as acetonitrile, propionitrile, butyronitrile, valeronitrile and benzonitrile; sulfolane, 3-methyl-sulfolane; amides such as dimethylformamide; sulfoxides such as dimethylsulfoxide; and alkyl phosphate esters such as trimethyl phosphate and triethyl phosphate. The nonaqueous solvents may be used singly, or two or more may be used in combination.

Examples of the lithium salts include strongly electron withdrawing lithium salts such as, for example, $LiPF_6$, $LiBF_4$, $LiClO_4$, $LiAsF_6$, $LiCF_3SO_3$, $LiN(SO_2CF_3)_2$, $LiN(SO_2C_2F_5)_2$ and $LiC(SO_2CF_3)_3$. The lithium salts may be used singly, or two or more may be used in combination. The concentration of the lithium salt in the nonaqueous electrolyte is, for example, 0.5 to 1.5 M, and preferably 0.7 to 1.2 M.

The nonaqueous electrolyte may appropriately contain additives. In order to, for example, form quality films on the positive and negative electrodes, vinylene carbonate (VC), cyclohexylbenzene (CHB), modified products thereof, etc. may be used. Examples of the additives which act in the event of overcharging of the lithium ion secondary batteries include, for example, terphenyl, cyclohexylbenzene and diphenyl ether.

The battery case is, for example, a cylindrical case having an opening. Some preferred materials thereof are aluminum alloys and nickel-plated steel sheets.

Hereinbelow, EXAMPLES of the present invention will be described. Incidentally, the contents mentioned here are only illustrative of the present invention and do not limit in any way the scope of the present invention thereto.

EXAMPLES 1 TO 7 AND COMPARATIVE EXAMPLES 1 AND 2

(1) Fabrication of Positive Electrodes 5

100 Parts by mass of lithium cobalt oxide as a positive electrode active material, 2 parts by mass of acetylene black as a conductive agent and 3 parts by mass of polyvinylidene fluoride as a binder were added to an appropriate amount of N-methyl-2-pyrrolidone (NMP). The mixture was kneaded to form a slurry mixture. The slurry was applied to both sides of strip of aluminum foil (15 μm in thickness) as a positive electrode current collector while ensuring that a portion of the aluminum foil would be left exposed for connection with a positive electrode lead 5a. The dried films of the mixture were pressed together with the positive electrode current collector to form positive electrode active material layers having a thickness of 163 μm. Thereafter, the current collector having the positive electrode active material layers was cut to a predetermined size. A positive electrode 5 was thus obtained. The positive electrode lead 5a made of aluminum was ultrasonically welded to the portion of the aluminum foil exposed from the mixture.

(2) Fabrication of Negative Electrodes 6

100 Parts by mass of flake graphite as a negative electrode active material, 1 part by mass of styrene butadiene rubber (SBR) as a binder and 1 part by mass of carboxymethylcellulose sodium as a thickener were added to an appropriate amount of water. The mixture was kneaded to form a slurry mixture. The slurry was applied to both sides of a strip of copper foil (10 μm in thickness) as a negative electrode current collector while ensuring that a portion of the copper foil would be left exposed for connection with a negative electrode lead 6a. The dried films of the mixture were pressed together with the negative electrode current collector to form negative electrode active material layers having a thickness of 168 μm. Thereafter, the current collector having the negative electrode active material layers was cut to a predetermined size. A negative electrode 6 was thus obtained. The negative electrode lead 6a made of nickel was resistance welded to the portion of the copper foil exposed from the mixture.

(3) Fabrication of Separators 7a and 7b

Polyethylene microporous films were provided as porous films. A mixture liquid including an NMP solution of heat resistant aramid resin, and alumina (1 μm in average particle size) as an inorganic filler was applied to a side of a predetermined sheet of the microporous film. The wet film was dried to form an HRL. The amount of the aramid was 50 parts by mass per 100 parts by mass of the alumina. In this manner, bilayer separators having a porous film and a heat resistant layer (HRL) were obtained.

The configurations (such as T1, T2, P1 and P2) of the first separators and the second separators obtained as described above are described in Table 1. Electrode assemblies for batteries A1 to A7 of EXAMPLES 1 to 7 and batteries B1 and B2 of COMPARATIVE EXAMPLES 1 and 2 were assembled using these separators. FIG. 4 to FIG. 10 illustrate sectional schematic views of the arrangements of the negative electrode, the first separator and the second separator used in EXAMPLES 1 to 7 and COMPARATIVE EXAMPLES 1 and 2. Incidentally, the first separator and the second separator in the battery B2 did not have HRL.

The porosity of the porous film was measured in the following manner. Five test pieces each having a 6.0 cm×6.0 cm size were cut from the porous film. The thicknesses and masses of the test pieces were measured, and the mass w per volume $(g/cm^3)$ was calculated from the average values of the five sheets. The void content V (%) was calculated from $100×(1-(w/s1))$ where s1 is the specific gravity $(g/cm^3)$ of the polyethylene.

(4) Fabrication of Nonaqueous Electrolyte Secondary Batteries

An electrode assembly 14 and a lower insulating plate 9 were placed into a metallic cylindrical battery case 1, and the negative electrode lead 6a was resistance welded to the inner bottom surface of the battery case 1. Next, an upper insulating ring was placed on the top surface of the electrode assembly 14, and the positive electrode lead 5a leading out beyond the battery case 1 was laser welded to a sealing plate 2. Next, a nonaqueous electrolyte was poured into the battery case. The opening of the battery case 1 was then sealed with the sealing plate 2 that was fitted with a gasket 13 along its periphery. Thus, an 18650 cylindrical battery with a nominal capacity of 3300 mAh was obtained.

The above nonaqueous electrolyte was prepared by dissolving $LiPF_6$ into a mixed solvent of ethylene carbonate (EC) and ethyl methyl carbonate (EMC) (2:1 by volume) with a concentration of 1.0 M, and adding 0.5 mass % of cyclohexylbenzene.

The cycle characteristics of the batteries obtained were evaluated. Five hundred cycles of charging and discharging were performed at a charging current of 0.7 C, a discharging current of 0.5 C and 45° C. The average capacity retention ratio of the batteries after 500 cycles relative to the initial capacity was calculated. The results are described in Table 2.

TABLE 1

| | Arrangement of HRL | First separator (outside) | | | | | Second separator (inside) | | | | |
|---|---|---|---|---|---|---|---|---|---|---|---|
| | | t1/μm | HRL/μm | T1/μm | P1/% | P1T1/μm % | t2/μm | HRL/μm | T2/μm | P2/% | P2T2/μm % |
| A1 | Positive electrode side | 10 | 4 | 14 | 51 | 714 | 12.5 | 4.5 | 17 | 50 | 850 |
| A2 | Positive electrode side | 10 | 4 | 14 | 51 | 714 | 15.5 | 4.5 | 20 | 54 | 1080 |
| A3 | Positive electrode side | 14 | 0 | 14 | 54 | 756 | 15.5 | 4.5 | 20 | 54 | 1080 |
| A4 | Positive electrode side | 10 | 4 | 14 | 51 | 714 | 20 | 0 | 20 | 68 | 1160 |
| A5 | Negative electrode side | 10 | 4 | 14 | 51 | 714 | 15.5 | 4.5 | 20 | 54 | 1080 |
| A6 | Negative electrode side | 14 | 0 | 14 | 54 | 756 | 15.5 | 4.5 | 20 | 54 | 1080 |
| A7 | Negative electrode side | 10 | 4 | 14 | 51 | 714 | 20 | 0 | 20 | 58 | 1160 |
| B1 | Positive electrode side | 12.5 | 4.5 | 17 | 50 | 850 | 12.5 | 4.5 | 17 | 50 | 850 |
| B2 | — | 14 | 0 | 14 | 50 | 700 | 16 | 0 | 16 | 58 | 928 |

TABLE 2

| | Cycle characteristics/% |
|---|---|
| A1 | 70 |
| A2 | 73 |
| A3 | 73 |
| A4 | 72 |
| A5 | 73 |
| A6 | 72 |
| A7 | 72 |
| B1 | 67 |
| B2 | 63 |

As seen from Tables 1 and 2, good cycle characteristics cannot be obtained when T1=T2 (the battery B1) even in the case where the first separator and the second separator both have an HRL. Further, good cycle characteristics cannot be obtained when the first separator and the second separator do no have an HRL even the case where T1<T2 is satisfied (the battery B2). In contrast, it has been demonstrated that good cycle characteristics can be obtained when at least one of the first separator and the second separator has an HRL and T1<T2 is satisfied (the batteries A1 to A7).

INDUSTRIAL APPLICABILITY

The separators of the present invention may be applied to various types of secondary batteries, and are particularly suited for high-capacity nonaqueous electrolyte secondary batteries.

REFERENCE SIGNS LIST

1 BATTERY CASE
2 SEALING PLATE
5 POSITIVE ELECTRODE
5a POSITIVE ELECTRODE LEAD
6 NEGATIVE ELECTRODE
6a NEGATIVE ELECTRODE LEAD
7a FIRST SEPARATOR
7b SECOND SEPARATOR
71a FIRST POROUS FILM
71b SECOND POROUS FILM
72a, 72b HRL
9 LOWER INSULATING PLATE
12 POSITIVE ELECTRODE EXTERNAL TERMINAL
13 GASKET
14 ELECTRODE ASSEMBLY

The invention claimed is:

1. A secondary battery comprising an electrode assembly comprising a positive electrode, a negative electrode, a first separator disposed on one side of surface of the negative electrode and having a thickness T1, and a second separator disposed on another side of surface of the negative electrode and having a thickness T2, wherein
    the thickness T2 of the second separator is larger than the thickness T1 of the first separator,
    the first separator comprises a first porous film having a porosity P1,
    the second separator comprises a second porous film having a porosity P2,
    at least one of the first separator and the second separator comprises a heat resistant layer only on the side facing the positive electrode,
    the positive electrode, the first separator, the negative electrode and the second separator are wound together in such a manner that the first separator is arranged on an outer side and the second separator is arranged on an inner side,
    the thickness of the second porous film is larger than that of the first porous film;
    the thickness T1 of the first separator is 10 to 30 μm;
    the thickness T2 of the second separator is 10 to 30 μm; and
    a product P2T2 of the porosity P2 of the second porous film multiplied by the thickness T2 of the second separator is larger than a product P1T1 of the porosity P1 of the first porous film multiplied by the thickness T1 of the first separator.

2. The secondary battery according to claim 1, wherein the heat resistant layer is arranged in opposed relation with the positive electrode.

3. The secondary battery according to claim 1, wherein the heat resistant layer is arranged in opposed relation with the negative electrode.

4. The secondary battery according to claim 1, wherein the first separator and the second separator each comprise the heat resistant layer, and
    a thickness of the heat resistant layer in the second separator is larger than the thickness of the heat resistant layer in the first separator.

5. The secondary battery according to claim 1, wherein the heat resistant layer comprises a heat resistant resin.

6. The secondary battery according to claim 1, wherein the heat resistant layer comprises an inorganic filler and a resin binder.

7. The secondary battery according to claim 1, wherein the negative electrode comprises a carbon material and a silicon material as negative electrode active materials.

8. The secondary battery according to claim 1, wherein the second separator includes the heat resistant layer and the heat resistant layer is arranged in opposed relation with the positive electrode.

9. The secondary battery according to claim 1, wherein the product P1T1 and the product P2T2 satisfy $1.1 \leq P2T2/P1 \leq 2.5$.

* * * * *